US 8,325,435 B2

(12) United States Patent
Yoo et al.

(10) Patent No.: US 8,325,435 B2
(45) Date of Patent: Dec. 4, 2012

(54) METHOD AND APPARATUS FOR ADJUSTING NUMBER OF ITERATIONS IN ITERATIVE DECODING PROCEDURE (75) Inventors: Je-Hong Yoo, Suwon-si (KR); Hwa Jun Kim, Hwaseong-si (KR)

(73) Assignee: Seagate Technology International, Grand Cayman (KY)

( * ) Notice: Subject to any disclaimer, the term of this patent is extended or adjusted under 35 U.S.C. 154(b) by 172 days.

(21) Appl. No.: 13/019,338

(22) Filed: Feb. 2, 2011

(65) Prior Publication Data

US 2011/0191645 A1     Aug. 4, 2011

(30) Foreign Application Priority Data

Feb. 3, 2010   (KR) .................. 10-2010-0010086

(51) Int. Cl.
*G11B 5/09* (2006.01)
(52) U.S. Cl. ............................ 360/53; 360/31; 714/704
(58) Field of Classification Search .................... 360/31, 360/53; 714/704
See application file for complete search history.

*Primary Examiner* — Wayne Young
*Assistant Examiner* — Brenda Bernardi
(74) *Attorney, Agent, or Firm* — Volentine & Whitt, PLLC (57) ABSTRACT

In a method of determining an iteration value for an iterative decoding process of a hard disk drive, a bit error rate (BER) of a digital signal is measured in multiple iterations. A difference is calculated between BERs of consecutive iterations, and the calculated differences are compared with a reference value. An adjusted iteration value is then determined based on the comparison.

20 Claims, 6 Drawing Sheets

| HEAD Number | Iteration Value | Inter Sector Gap |
|---|---|---|
| HEAD 0 | 5 | — |
| HEAD 1 | 7 | Increase |
| HEAD 2 | 3 | — |
| HEAD 3 | 8 | Increase |

FIG. 6

METHOD AND APPARATUS FOR ADJUSTING NUMBER OF ITERATIONS IN ITERATIVE DECODING PROCEDURE

CROSS-REFERENCE TO RELATED APPLICATIONS

This application claims priority under 35 U.S.C. §119 to Korean Patent Application No. 10-2010-0010086 filed on Feb. 3, 2010, the disclosure of which is hereby incorporated by reference in its entirety.

BACKGROUND

Embodiments of the inventive concept relate generally to electronic memory technologies. More particularly, embodiments of the inventive concept relate to techniques for improving the read performance of certain electronic memory technologies.

A hard disk drive (HDD) stores data in the form of magnetic patterns on a surface of a magnetic disk. The HDD reads the data by detecting the magnetic patterns using a transducer, and converting the detected patterns into a digital signal (e.g., a binary data sequence) through a series of processes, such as amplification, analog-to-digital conversion, and error correction. The HDD then transmits the digital signal to a host.

The detected patterns generally contain noise, so HDDs rely on signal processing techniques to identify the digital signal from the patterns. For instance, some HDDs use iterative decoding schemes in which a plurality of loops are performed to determine a digital signal having a relatively high likelihood given the detected patterns. In some schemes, each loop generates a putative digital signal using various decoding and/or evaluation techniques such as Viterbi decoding, parity checking, and so on. The decoding scheme then determines a bit error rate of the putative digital signal, and outputs the putative digital signal if the bit error rate falls below a predetermined threshold.

The bit error rate of the putative digital signal tends to decrease as further loops are performed; however, performing further loops also increases the amount of time required to perform a read operation. Accordingly, in an HDD employing an iterative decoding scheme for read operations, there is a tradeoff between the accuracy and the speed of the read operations.

SUMMARY

Certain embodiments of the inventive concept provide methods and apparatuses for setting an adjusted iteration value for each of a plurality of HDD heads. These embodiments can improve read performance of an HDD.

According to one embodiment of the inventive concept, a method is provided for setting an adjusted iteration value for an iterative decoding process of a hard disk drive. The method comprises measuring a bit error rate (BER) of a digital signal in each of a plurality of iterations of the decoding process, wherein the digital signal is derived from an analog signal generated by a head of the hard disk drive. The method further comprises calculating differences between BERs measured in pairs of consecutive iterations among the plurality of iterations, comparing the calculated differences with a reference value, and setting the adjusted iteration value for the head based on the comparison, wherein the adjusted iteration value indicates a number of iterations to be performed by the iterative decoding process to decode data sensed by the head.

In certain embodiments, setting the adjusted iteration value comprises identifying a lowest pair of consecutive iterations for which the difference between BERs is less than the reference value, and selecting an iteration value of one of the identified iterations as the adjusted iteration value.

In certain embodiments, the method further comprises adjusting a value of an inter sector gap based on the adjusted iteration value.

In certain embodiments, adjusting the value of the inter sector gap comprises increasing the inter sector gap upon determining that the adjusted iteration value is greater than a default value. In certain embodiments, the method is performed during a burn-in process.

In certain embodiments, the method further comprises determining adjusted iteration values for a plurality of heads in the hard disk drive. In certain embodiments, the digital signal is generated by a read channel circuit of the hard disk drive.

In certain embodiments, the read channel circuit transmits the digital signal to a hard disk controller and the hard disk controller detects the BER of the digital signal.

According to another embodiment of the inventive concept, a hard disk drive comprises a disk, a head configured to read an analog signal from the disk, a pre-amplifier configured to amplify the analog signal read by the head, and a control unit configured to convert the analog signal amplified by the pre-amplifier into a digital signal, measure a BER of the digital signal in each of a plurality of iterations having corresponding iteration values, calculate a difference between BERs measured in pairs of consecutive iterations, compare the calculated differences between BERs with a reference value, and select an adjusted iteration value for the head based on the comparison.

In certain embodiments, the control unit selects the adjusted iteration value from among a lowest pair of consecutive iterations among the plurality of iterations.

In certain embodiments, the control unit stores the adjusted iteration value in an area of the disk using the pre-amplifier and the head.

In certain embodiments, the control unit adjusts a value of an inter sector gap of the disk based on the adjusted iteration value and stores the adjusted value of the inter sector gap in an area of the disk using the pre-amplifier and the head.

In certain embodiments, the control unit increases the value of the inter sector gap upon determining that the adjusted iteration value is greater than a default value.

In certain embodiments, the control unit maintains the inter sector gap at the default value upon determining that the adjusted value is not greater than the default value.

In certain embodiments, the hard disk drive further comprises a plurality of disks, wherein the control unit determines an adjusted iteration value for each of the plurality of disks.

According to another embodiment of the inventive concept, a computer system comprises a hard disk drive, and a host configured to exchange data with the hard disk drive. The hard disk drive comprises a magnetic disk, a head configured to read an analog signal from the magnetic disk, a pre-amplifier configured to amplify the analog signal read by the head, and a control unit. The control unit is configured to convert the analog signal amplified by the pre-amplifier into a digital signal, measure a BER of the digital signal in each of a plurality of iterations having corresponding iteration values, calculate a difference between BERs measured in pairs of consecutive iterations, compare the calculated differences between BERs with a reference value, and select an adjusted iteration value for the head based on the comparison.

In certain embodiments, the control unit selects the adjusted iteration value from among a lowest pair of consecutive iterations among the plurality of iterations.

In certain embodiments, the control unit stores the adjusted iteration value in an area of the disk using the pre-amplifier and the head.

In certain embodiments, the control unit adjusts a value of an inter sector gap of the disk based on the adjusted iteration value and stores the adjusted value of the inter sector gap in an area of the disk using the pre-amplifier and the head.

In certain embodiments, the control unit increases the value of the inter sector gap upon determining that the adjusted iteration value is greater than a default value.

BRIEF DESCRIPTION OF THE DRAWINGS

The drawings illustrate selected embodiments of the inventive concept. In the drawings, like reference numbers indicate like features.

DETAILED DESCRIPTION OF THE EMBODIMENTS

Embodiments of the inventive concept are described below with reference to the accompanying drawings. These embodiments are presented as teaching examples and should not be construed to limit the scope of the inventive concept.

In the description that follows, where an element is referred to as being "connected" or "coupled" to another element, it can be directly connected or coupled to the other element or intervening elements may be present. In contrast, where an element is referred to as being "directly connected" or "directly coupled" to another element, there are no intervening elements present. As used herein, the term "and/or" indicates any and all combinations of one or more of the associated listed items and may be abbreviated as "/".

Although the terms first, second, etc. may be used herein to describe various elements, the described elements should not be limited by these terms. Rather, these terms are used merely to distinguish one element from another. For example, a first signal could be termed a second signal, and a second signal could be termed a first signal without departing from the teachings of the disclosure.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. The terms "comprises" and/or "comprising," or "includes" and/or "including" where used in this specification, indicate the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concept belongs. Terms such as those defined in commonly used dictionaries should be interpreted as having a meaning that is consistent with their meaning in the context of the relevant art and/or the present application, and will not be interpreted in an idealized or overly formal sense unless expressly so defined herein.

Figure 1:
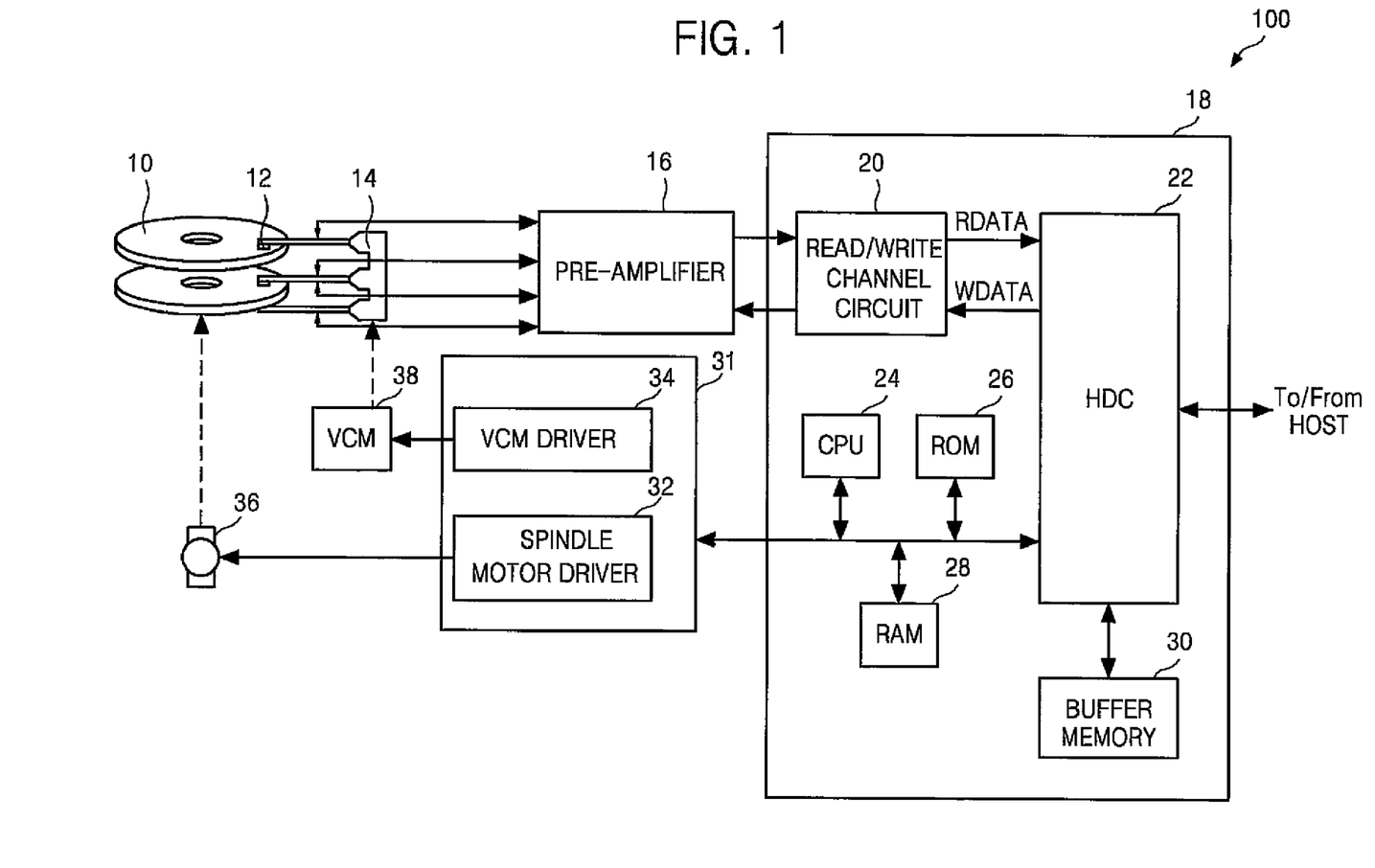
FIG. 1 is a block diagram of an HDD according to an embodiment of the inventive concept.

FIG. 1 is a block diagram of an HDD 100 according to an embodiment of the inventive concept.

Referring to FIG. 1, HDD 100 comprises a plurality of disks 10, a plurality of heads 12, a head assembly 14, a pre-amplifier 16, a main control unit 18, a motor driving unit (or a servo control unit) 31, a spindle motor 36, and a voice coil motor (VCM) 38. Main control unit 18 comprises a read/write channel circuit 20, an HDC 22, a central processing unit (CPU) 24, a read only memory (ROM) 26, a random access memory (RAM) 28, and a buffer memory 30. Motor driving unit 31 comprises a spindle motor driver 32 and a VCM driver 34.

Disks 10 store data received from a host. Each disk 10 comprises a magnetic recording medium. Spindle motor 36 spins disks 10.

Heads 12 are positioned over the respective disks 10 and perform read or write operations. Heads 12 are installed on corresponding support arms extending toward the respective disks 10 from head assembly 14. VCM 38 is coupled to head assembly 14 to control movement of the support arms.

To read data from one of disks 10, pre-amplifier 16 amplifies an analog signal output from one of heads 12 and outputs a resulting amplified analog signal to a read/write channel circuit 20. To write data to one of disks 10, pre-amplifier 16 transmits a write signal, e.g., a write current, output from read/write channel circuit 20 to one of heads 12. Then, the one of heads 12 writes the write signal to one of disks 10.

Read/write channel circuit 20 converts the amplified analog signal into a digital signal and outputs the digital signal to HDC 22. Read/write channel circuit 20 performs the conversion from the amplified analog signal to the digital signal using an iterative decoding procedure performed independently or under the control of CPU 24

HDC 22 measures the BER of the digital signal output from read/write channel circuit 20 in each iteration of the decoding procedure up to a predetermined iteration value (e.g., 12). HDC 22 then calculates a difference between BERs measured in consecutive iterations (e.g., between iteration values of 1 and 2, 2 and 3, or 3 and 4), and compares each of the BER differences with a reference value. Based on the comparison, HDC 22 sets an adjusted iteration value for the head 12 under test. The adjusted iteration value is a value less than the predetermined iteration value. HDC 22 typically sets the adjusted value as one of two consecutive iteration values that produce a BER difference less than the reference value. In addition, HDC 22 can determine an optimal iteration value for each of heads 12.

In a write operation for one of disks 10, CPU 24 controls HDC 22 to receive write data from the host, and further controls HDC 22 to output the write data to read/write channel circuit 20. Read/write channel circuit 20 converts write data into a write signal and outputs the write signal to pre-amplifier 16. The write data is then written to the disk 10 using one of heads 12.

In a read operation of one of disks 10, CPU 24 controls HDC 22 to receive read data decoded by read/write channel circuit 20, correct errors in the read data, and transmit error-corrected data to the host.

CPU 24 controls the operation of main control unit 18 using program code that implements a method for determining the adjusted iteration value for each of heads 12. CPU 24 reads the program code from ROM 26, stores the program code in RAM 28, and executes the program code from RAM 28 to control the operation of HDD 100 or HDC 22.

CPU 24 receives a read or write command output from the host and controls spindle motor driver 32 and VCM driver 34 to control track seek or track following according to the received command. In response to at least one control signal output from HDC 22, spindle motor driver 32 controls the operation of spindle motor 36, which controls the rotation of disks 10. In response to a control signal output from HDC 22, VCM driver 34 generates a driving current for driving VCM 38 and outputs the driving current to a voice coil of VCM 38. VCM 38 moves one of heads 12 to over a track of one of disks 10 according to the direction and the level of the driving current output from VCM driver 34.

Buffer memory 30 can be implemented inside or outside main control unit 18. Buffer memory 30 temporarily stores data transferred between HDD 100 and the host. Buffer memory 30 typically comprises a volatile memory such as dynamic random access memory (DRAM).

Main control unit 18 can be implemented in a single chip, e.g., a system-on-chip (SoC). In addition, motor driving unit 31 can also be implemented in a single chip.

Figure 2:
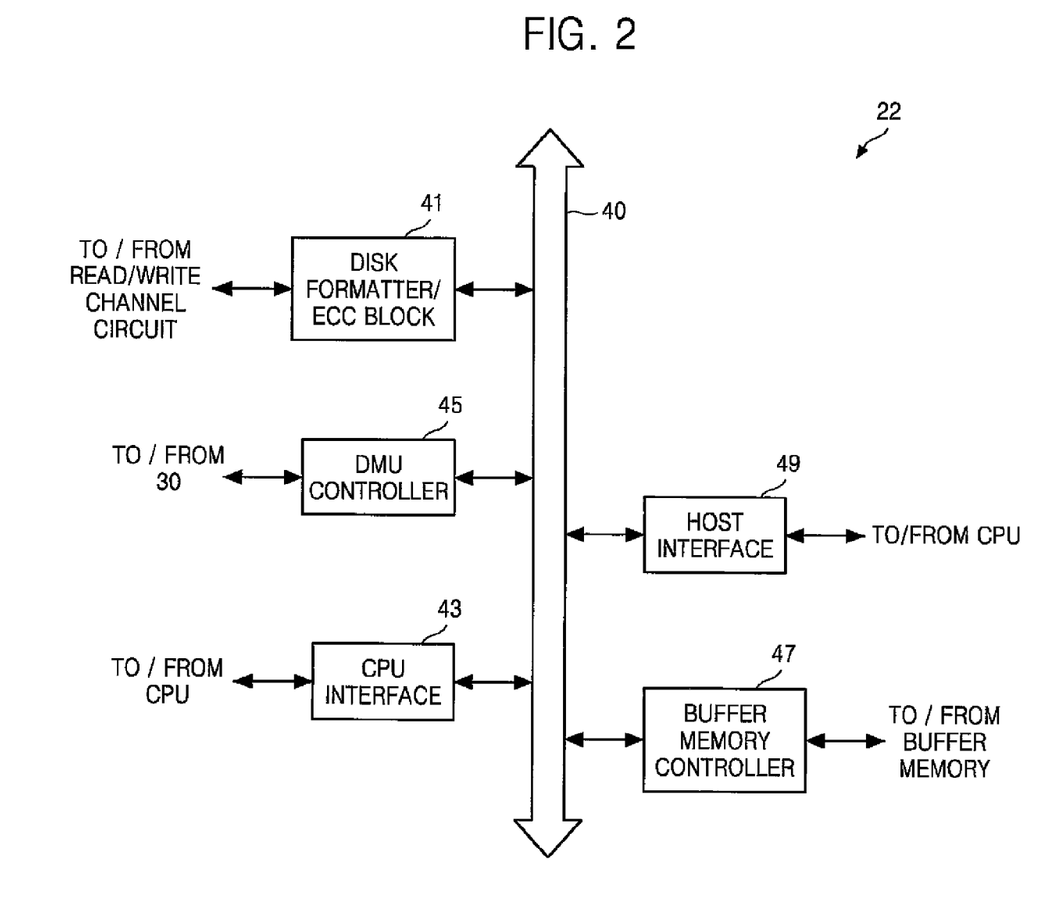
FIG. 2 is a block diagram illustrating an embodiment of a hard disk controller (HDC) shown in FIG. 1.

FIG. 2 is a block diagram illustrating an embodiment of HDC 22 shown in FIG. 1.

In the embodiment of FIG. 2, HDC 22 comprises a disk formatter/error correcting code (ECC) block 41, a CPU interface 43, a motor driving unit controller 45, a buffer memory controller 47, and a host interface 49.

Disk formatter/ECC block 41 detects a BER or a channel statistic measurement (CSM) for each iteration value within a predetermined iteration value from a digital signal output from read/write channel circuit 20. In some embodiments, disk formatter/ECC block 41 also performs error correction on the digital signal output from read/write channel circuit 20 and transmits the error-corrected read data to buffer memory 30 via buffer memory controller 47 or to the host via host interface 49.

During a write operation, disk formatter/ECC block 41 receives write data from the host via host interface 49 or from buffer memory controller 47, formats the write data so that it can be written to a disk, and transmits the formatted data to read/write channel circuit 20. The formatting can comprise, for example, inserting error correcting codes into the write data. During a read operation, disk formatter/ECC block 41 performs error correction on read data received from read/write channel circuit 20 and transmits the error-corrected data to CPU interface 43, buffer memory controller 47, or host interface 49.

In some embodiments disk formatter/ECC block 41 measures a BER of the read data output from read/write channel circuit 20 at each iteration value within a predetermined iteration value (e.g., 12), calculates a difference between BERs measured in consecutive iteration values (e.g., 1 and 2, 2 and 3, or 3 and 4), compares the BER differences with a reference value, and sets an adjusted iteration value for one of head 12 based on the comparison. In some embodiments, disk formatter/ECC block 41 determines an optimal iteration value for each of heads 12. The adjusted iteration value typically comprises one of two lowest consecutive iteration values that produce a BER difference less than the reference value.

In some embodiments, disk formatter/ECC block 41 performs error correction on the read data output from read/write channel circuit 20 and transmits the error-corrected data to CPU 24 via CPU interface 43. CPU 24 measures a BER of the error-corrected data at each iteration value within a predetermined iteration value (e.g., 12), calculates a difference between BERs measured at two consecutive iteration values (e.g., 1 and 2, 2 and 3, or 3 and 4), compares each of BER differences between pairs of consecutive iteration values with a reference value, and sets an iteration value smaller than the predetermined iteration value as an adjusted iteration value for a test head according to the comparison results. Using this procedure, CPU 24 can determine an adjusted iteration value for each of heads 12.

CPU 24 and HDC 22 transmit or receive control signals or data to or from each other via CPU interface 43.

Motor driving unit controller 45 controls the operation of motor driving unit 31 under the control of CPU 24. Motor driving unit controller 45 controls the operation of at least one of spindle motor driver 32 and VCM driver 34.

Buffer memory controller 47 controls the operation of buffer memory 30 under the control of CPU 24. Buffer memory controller 47 controls buffer memory 30 to store data received via host interface 49. Buffer memory controller 47 also controls buffer memory 30 to transmit data to disk formatter/ECC block 41, host interface 49, or CPU interface 43.

Figure 3:
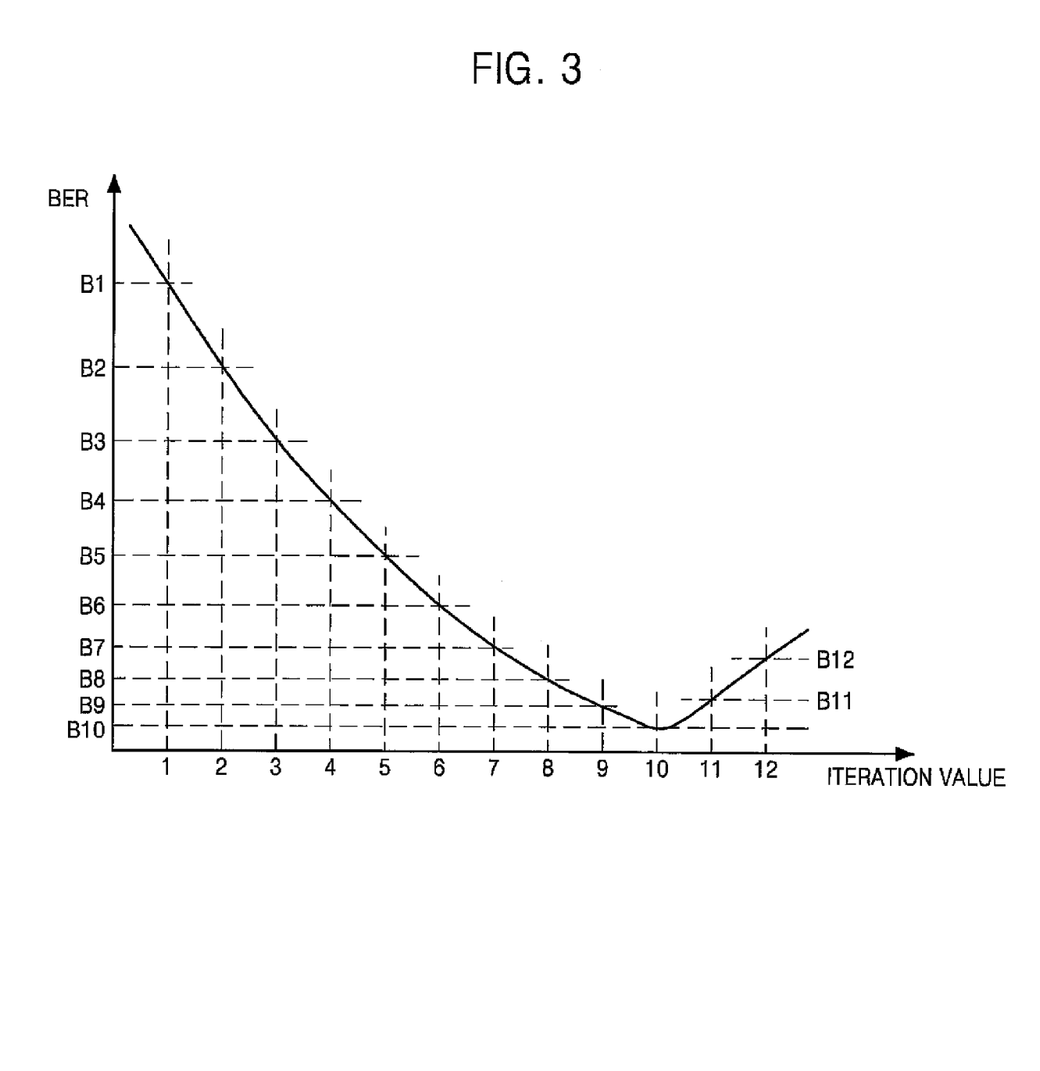
FIG. 3 is a graph of BER as a function of a read iteration value in the HDD of FIG. 1.

FIG. 3 is a graph illustrating BER as a function of iteration value where a predetermined iteration value is 12. In FIG. 3, the x-axis indicates the iteration value and the y-axis indicates BER. As indicated by FIG. 3, the BER decreases until it reaches a minimum at iteration value 10, and increases thereafter.

Figure 4:
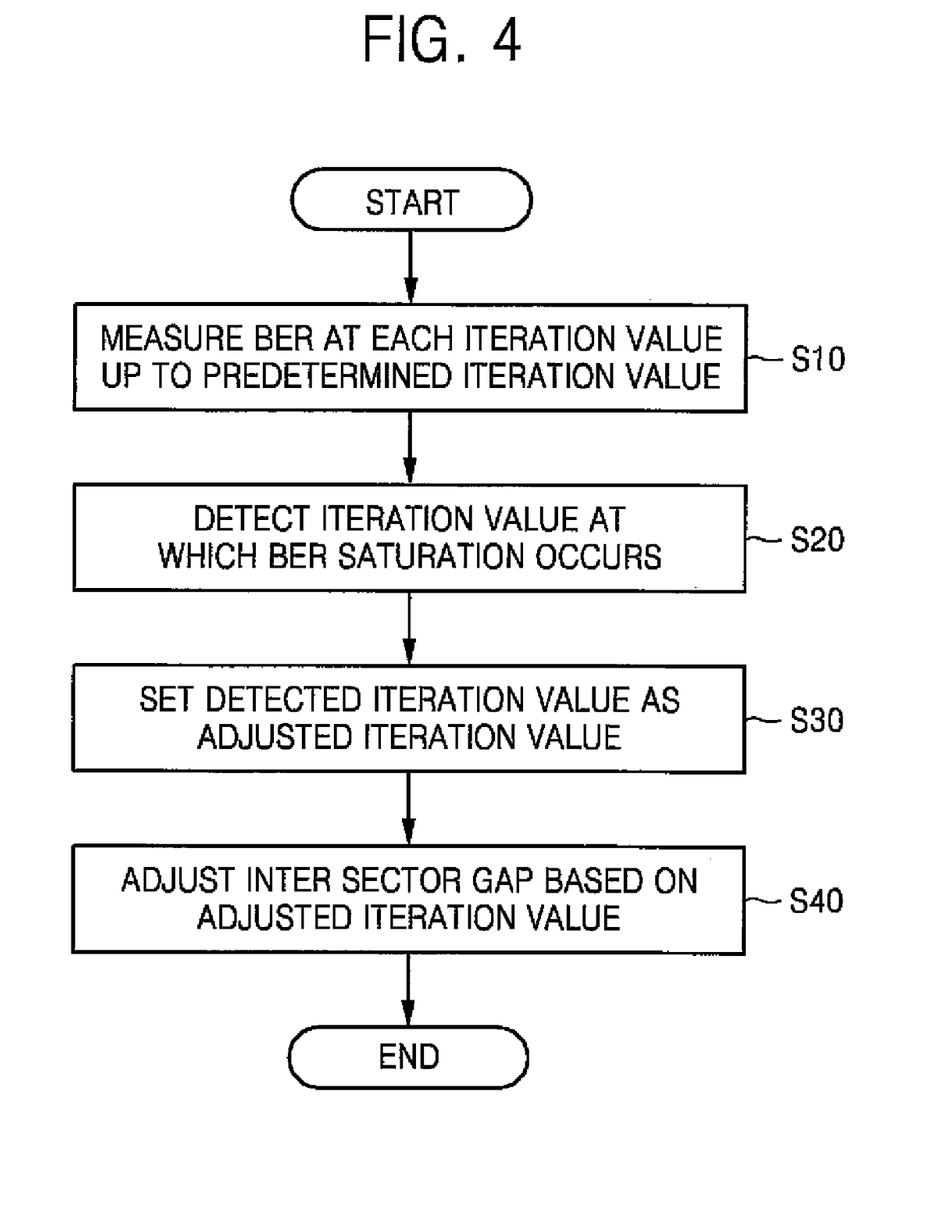
FIG. 4 is a flowchart illustrating a method of setting an iteration value in the HDD of FIG. 1 according to an embodiment of the inventive concept.
Figure 5:
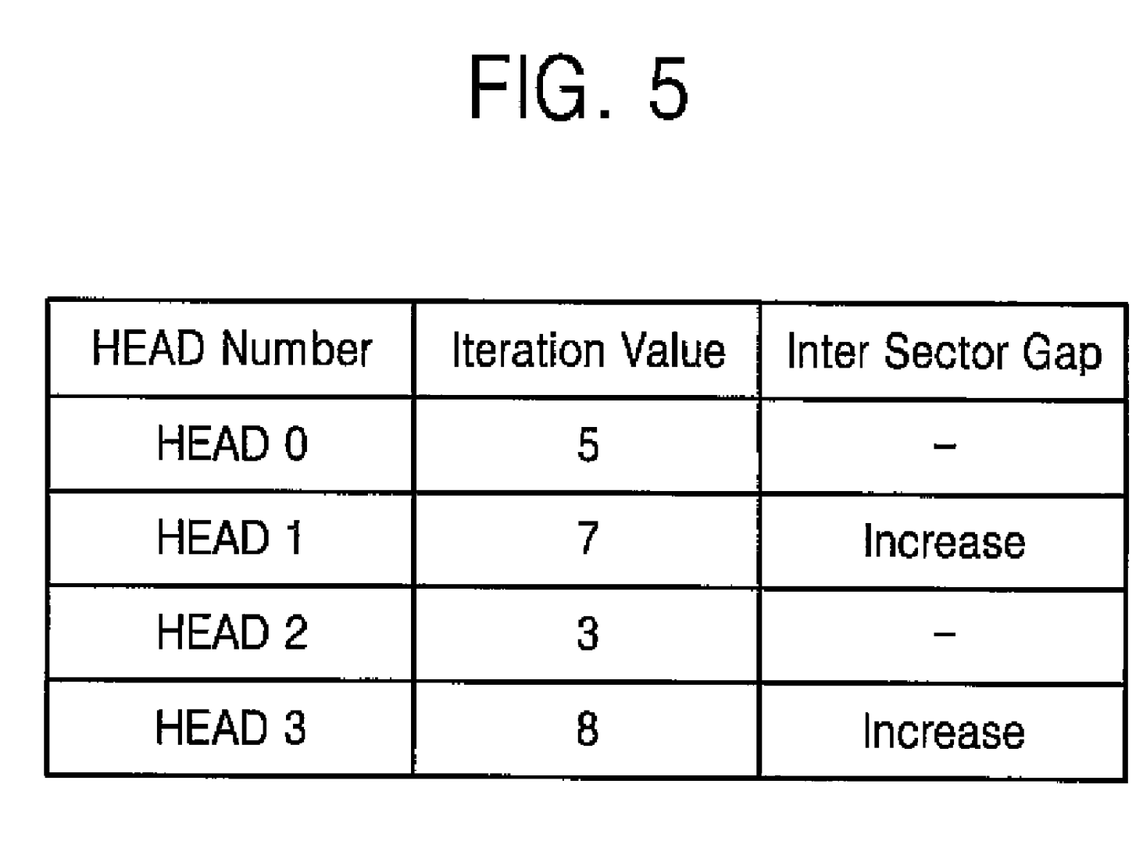
FIG. 5 is a table illustrating an iteration value and an inter sector gap set by the HDD of FIG. 1 for each head.

FIG. 4 is a flowchart of method of setting an iteration value in HDD 100 of FIG. 1 according to an embodiment of the inventive concept, and FIG. 5 is a table showing an iteration value and an inter sector gap set by HDD 100 for each head 12. The method of FIG. 4 will be described in with reference to FIGS. 1 through 5. The method of FIG. 4 can be performed, for instance, during a burn-in process of HDD 100. In the description that follows, example method steps are indicated by parentheses.

For explanation purposes, it will be assumed that HDD 100 comprises four HEADs 0 through 3, a predetermined iteration value is 12, a BER measured by main control unit 18 is an absolute value, a reference value is 0.5, and an inter sector gap at a default iteration value is 5.

To determine an adjusted iteration value for first HEAD 0, read/write channel circuit 20 converts an analog signal amplified by pre-amplifier 16 into a digital signal. HDC 22 measures a BER of the digital signal at each iteration value up to a predetermined iteration value (S10).

As an example, BERs B1 through B12 are measured by main control unit 18 at iteration values 1 through 12, respectively, as shown in FIG. 3. HDC 22 calculates differences D1 through D11 between pairs of BERs B1 and B2, B2 and B3, . . . , B11 and B12 measured at pairs of consecutive iteration values, i.e., 1 and 2, 2 and 3, . . . , 11 and 12, respectively. Differences D1 through D11 are shown in Table 1 below.

TABLE 1

| Iteration value | Measured BER | Difference |
| --- | --- | --- |
| 1 | B1 | — |
| 2 | B2 | D1 = B2 − B1 = 4 |

TABLE 1-continued

| Iteration value | Measured BER | Difference |
|---|---|---|
| 3 | B3 | D2 = B3 − B2 = 3 |
| 4 | B4 | D3 = B4 − B3 = 2 |
| 5 | B5 | D4 = B5 − B4 = 1 |
| 6 | B6 | D5 = B6 − B5 = 0.4 |
| 7 | B7 | D6 = B7 − B6 = 0.4 |
| 8 | B8 | D7 = B8 − B7 = 0.3 |
| 9 | B9 | D8 = B9 − B8 = 0.3 |
| 10 | B10 | D9 = B10 − B9 = 0.2 |
| 11 | B11 | D10 = B11 − B10 = 0.2 |
| 12 | B12 | D11 = B12 − B11 = 0.2 |

HDC 22 compares each of differences D1 through D11 with a reference value 0.5 and sets one of iteration values 1 through 12 as an adjusted iteration value according to the comparison. In some embodiments, the adjusted iteration value is a lowest iteration value where a corresponding computed difference is less than the reference value. In the example of Table 1, the adjusted iteration value is 5.

HDC 22 detects an iteration value at which BER saturation occurs (S20) and sets the detected iteration value as the adjusted iteration value for first HEAD 0. For instance, HDC 22 sets as the adjusted iteration value for first HEAD 0 one of two iteration values (e.g., 5 and 6) giving a difference (e.g., D5) that is less than the reference value 0.5 (S30).

Referring to FIG. 5, HDC 22 sets adjusted iteration values of 5, 7, 3, and 8 for four HEADs 0 through 3, respectively, under the control of CPU 24 using operations S10 through S30 shown in FIG. 4. In some embodiments, main control unit 18 stores the adjusted iteration values of 5, 7, 3, and 8 for the respective HEADs 0 through 3 in corresponding disks 10. Accordingly, HDD 100 can achieve improved read performance using the adjusted iteration values of 5, 7, 3, and 8 stored in disks 10 corresponding to respective HEADs 0 through 3. In some embodiments, main control unit 18 stores adjusted iteration values of 5, 7, 3, and 8 for the respective HEADs 0 through 3 in one of disks 10 using pre-amplifier 16 and one of heads 12. Accordingly, HDD 100 can achieve improved read performance according to the adjusted iteration values of 5, 7, 3, and 8 stored in the one of disks 10.

In the table of FIG. 5, the adjusted iteration values of HEADs 1 and 3 are 7 and 8, respectively. Because these adjusted iteration values are greater than the default iteration value of 5, the read time of a single sector is increased for HEADs 1 and 3. Accordingly, the value of an inter sector gap allocated to each of HEADs 1 and 3 needs to be increased (S40). To adjust the inter sector gap, main control unit 18 reconstructs a zone-map of the corresponding disks 10 and stores the reconstructed zone-map in an area of one of disks 10 under the control of CPU 24 (S40).

Figure 6:
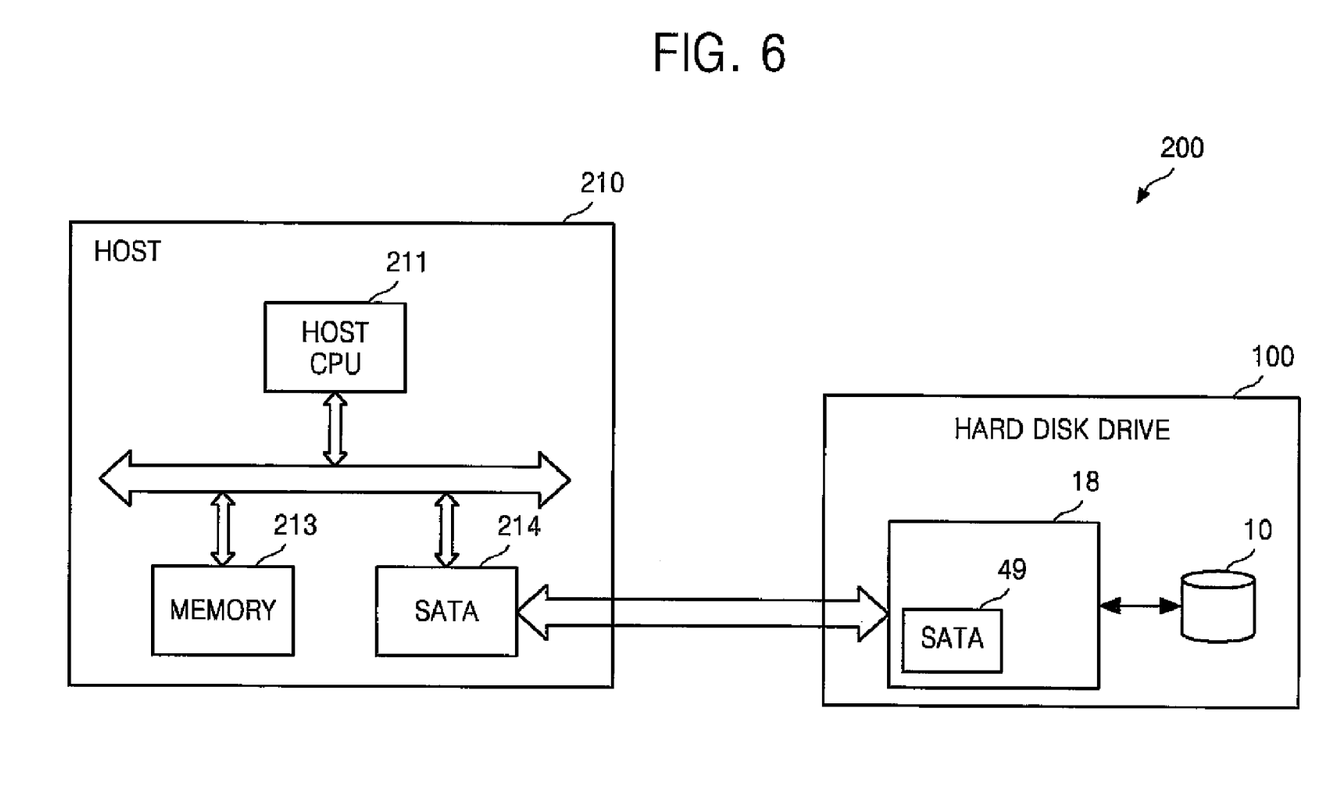
FIG. 6 is a block diagram of a data processing system comprising the HDD of FIG. 1 according to an embodiment of the inventive concept.

FIG. 6 is a block diagram of a data processing system or a computer system 200 comprising HDD 100 of FIG. 1 according to an embodiment of the inventive concept. Computer system 200 comprises HDD 100 and a host 210 that exchanges data with HDD 100.

Referring to FIGS. 1 through 6, HDD 100 comprises head 12 that reads an analog signal from disk 10, pre-amplifier 16 amplifying the analog signal read by head 12, and main control unit 18 setting an adjusted iteration value for head 12 in response to the amplified analog signal produced by pre-amplifier 16.

Main control unit 18 converts the amplified analog signal into a digital signal, measures a BER of the digital signal in multiple iterations up to a predetermined iteration value, calculates a difference between BERs measured at consecutive iteration values, compares each of the differences with a reference value, and sets one of the iteration values as an adjusted iteration value for head 12 based on the comparison. Main control unit 18 selects as the adjusted iteration value one of two consecutive iteration values that first produce a BER difference less than the reference value. Main control unit 18 adjusts the value of an inter sector gap based on the adjusted iteration value and controls the adjusted value of the inter sector gap to be stored in a particular area of a disk 10 using pre-amplifier 16 and head 12.

Host 210 comprises a host CPU 211, a memory 213, and an interface 214. Host CPU 211 controls the operation of host 210 and transmits data from memory 213 to host interface 49 of main control unit 18 of HDD 100 via interface 214 during a write operation. Interface 214 and host interface 49 comprise a serial advanced technology attachment (SATA) interface. Accordingly, interface 214 receives/transmits data from/to host interface 49 using a SATA protocol.

In a read operation, interface 214 is controlled by host CPU 211 to store data transmitted from HDD 100 in memory 213. Host CPU 211 processes data stored in memory 213. For instance, host CPU 211 can display the data using a display device or output the data using a peripheral device such as a printer connected via a universal serial bus (USB) port.

As indicated by the foregoing, in some embodiments of the inventive concept, an adjusted iteration value is set for each of heads in an HDD. In addition, an inter sector gap is adaptively adjusted for each head according to the adjusted iteration value set for the head. The adjusted iteration value and inter sector gap can improve the read performance of the HDD.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A method of setting an adjusted iteration value for an iterative decoding process of a hard disk drive, the method comprising:
   measuring a bit error rate (BER) of a digital signal in each of a plurality of iterations of the decoding process, wherein the digital signal is derived from an analog signal generated by a head of the hard disk drive;
   calculating differences between BERs measured in pairs of consecutive iterations among the plurality of iterations;
   comparing the calculated differences with a reference value; and
   setting the adjusted iteration value for the head based on the comparison, wherein the adjusted iteration value indicates a number of iterations to be performed by the iterative decoding process to decode data sensed by the head.

2. The method of claim 1, wherein setting the adjusted iteration value comprises identifying a lowest pair of consecutive iterations for which the difference between BERs is less than the reference value, and selecting an iteration value of one of the identified iterations as the adjusted iteration value.

3. The method of claim 1, further comprising adjusting a value of an inter sector gap based on the adjusted iteration value.

4. The method of claim 3, wherein adjusting the value of the inter sector gap comprises increasing the inter sector gap upon determining that the adjusted iteration value is greater than a default value.

5. The method of claim 1, wherein the method is performed during a burn-in process.

6. The method of claim 1, further comprising determining adjusted iteration values for a plurality of heads in the hard disk drive.

7. The method of claim 1, wherein the digital signal is generated by a read channel circuit of the hard disk drive.

8. The method of claim 7, wherein the read channel circuit transmits the digital signal to a hard disk controller and the hard disk controller detects the BER of the digital signal.

9. A hard disk drive comprising:
a disk;
a head configured to read an analog signal from the disk;
a pre-amplifier configured to amplify the analog signal read by the head; and
a control unit configured to convert the analog signal amplified by the pre-amplifier into a digital signal, measure a bit error rate (BER) of the digital signal in each of a plurality of iterations having corresponding iteration values, calculate a difference between BERs measured in pairs of consecutive iterations, compare the calculated differences between BERs with a reference value, and select an adjusted iteration value for the head based on the comparison.

10. The hard disk drive of claim 9, wherein the control unit selects the adjusted iteration value from among a lowest pair of consecutive iterations among the plurality of iterations.

11. The hard disk drive of claim 9, wherein the control unit stores the adjusted iteration value in an area of the disk using the pre-amplifier and the head.

12. The hard disk drive of claim 9, wherein the control unit adjusts a value of an inter sector gap of the disk based on the adjusted iteration value and stores the adjusted value of the inter sector gap in an area of the disk using the pre-amplifier and the head.

13. The hard disk drive of claim 12, wherein the control unit increases the value of the inter sector gap upon determining that the adjusted iteration value is greater than a default value.

14. The hard disk drive of claim 13, wherein the control unit maintains the inter sector gap at the default value upon determining that the adjusted value is not greater than the default value.

15. The hard disk drive of claim 9, further comprising a plurality of disks, wherein the control unit determines an adjusted iteration value for each of the plurality of disks.

16. A computer system comprising:
a hard disk drive; and
a host configured to exchange data with the hard disk drive, wherein the hard disk drive comprises:
a magnetic disk;
a head configured to read an analog signal from the magnetic disk;
a pre-amplifier configured to amplify the analog signal read by the head; and
a control unit configured to convert the analog signal amplified by the pre-amplifier into a digital signal, measure a bit error rate (BER) of the digital signal in each of a plurality of iterations having corresponding iteration values, calculate a difference between BERs measured in pairs of consecutive iterations, compare the calculated differences between BERs with a reference value, and select an adjusted iteration value for the head based on the comparison.

17. The computer system of claim 16, wherein the control unit selects the adjusted iteration value from among a lowest pair of consecutive iterations among the plurality of iterations.

18. The computer system of claim 16, wherein the control unit stores the adjusted iteration value in an area of the disk using the pre-amplifier and the head.

19. The computer system of claim 16, wherein the control unit adjusts a value of an inter sector gap of the disk based on the adjusted iteration value and stores the adjusted value of the inter sector gap in an area of the disk using the pre-amplifier and the head.

20. The computer system of claim 19, wherein the control unit increases the value of the inter sector gap upon determining that the adjusted iteration value is greater than a default value.

* * * * *